(12) United States Patent
Mizoguchi

(10) Patent No.: US 8,562,477 B2
(45) Date of Patent: Oct. 22, 2013

(54) DIFFERENTIAL GEAR AND VEHICLE PROVIDED WITH DIFFERENTIAL GEAR

(75) Inventor: Norihiro Mizoguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 268 days.

(21) Appl. No.: 13/145,890

(22) PCT Filed: Apr. 8, 2010

(86) PCT No.: PCT/IB2010/000761
§ 371 (c)(1),
(2), (4) Date: Jul. 22, 2011

(87) PCT Pub. No.: WO2010/116235
PCT Pub. Date: Oct. 14, 2010

(65) Prior Publication Data
US 2012/0028750 A1 Feb. 2, 2012

(30) Foreign Application Priority Data

Apr. 9, 2009 (JP) ................................. 2009-094954

(51) Int. Cl.
*F16H 48/06* (2006.01)
(52) U.S. Cl.
USPC ........................................................ 475/220
(58) Field of Classification Search
USPC .......................................... 475/220, 230, 248
See application file for complete search history.

(56) References Cited

U.S. PATENT DOCUMENTS

| 6,945,898 B2 * | 9/2005 | Szuba ............................ 475/230 |
| 7,294,084 B2 * | 11/2007 | Koehler et al. ................ 475/230 |
| 2007/0287570 A1 | 12/2007 | Bock | |
| 2011/0263374 A1 * | 10/2011 | Cripsey et al. ................ 475/220 |

FOREIGN PATENT DOCUMENTS

| FR | 2 293 329 A1 | 7/1976 |
| JP | A-7-54960 | 2/1995 |
| JP | A-2003-520928 | 7/2003 |
| JP | A-2006-509172 | 3/2006 |
| WO | WO 2004/028722 A1 | 4/2004 |
| WO | WO 2004/053357 A1 | 6/2004 |

OTHER PUBLICATIONS

International Search Report issued in International Application No. PCT/IB2010/000761 on Aug. 16, 2010.
Written Opinion of the International Searching Authority issued in International Application No. PCT/IB2010/000761 on Aug. 16, 2010.

* cited by examiner

*Primary Examiner* — Sherry Estremsky
(74) *Attorney, Agent, or Firm* — Oliff & Berridge, PLC

(57) ABSTRACT

A differential gear is structured such that a first differential case and a second differential case overlap one another in the radial direction such that a first joining portion of the first differential case, i.e., a portion of an outward flange that is on the outer peripheral side of a through-hole, is positioned on the outer peripheral side of a second joining portion of the second differential case, i.e., a joining protrusion that is inserted in the through-hole. In addition, the ring gear is arranged facing those joining portions in the direction of the axis, and laser beam welded from the outer peripheral side at the portion where the ring gear faces both of those joining portions. Accordingly, the three members, i.e., the first differential case, the second differential case, and the ring gear, are all integrally joined together by a single welding operation, and manufacturing costs can be reduced.

4 Claims, 2 Drawing Sheets

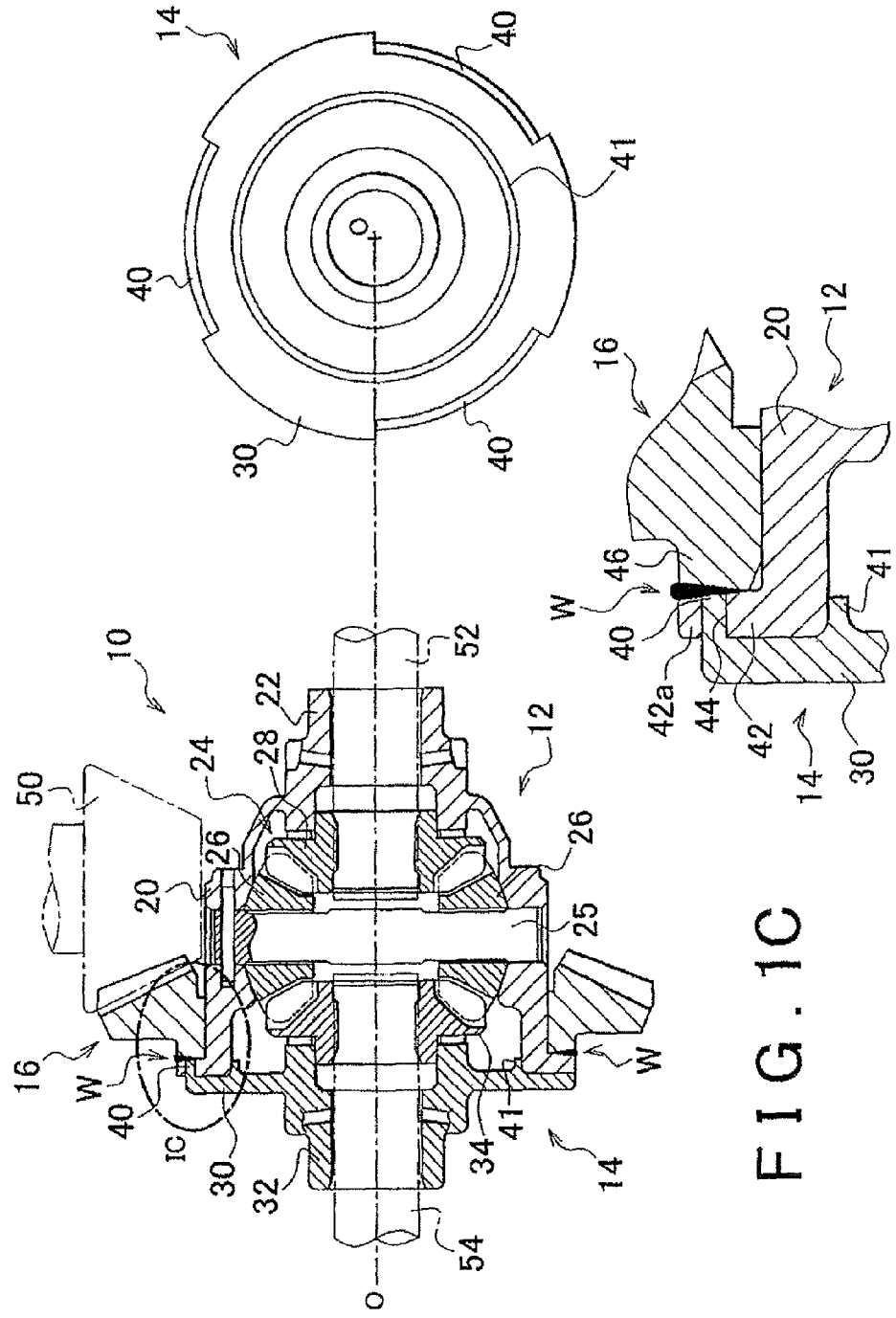

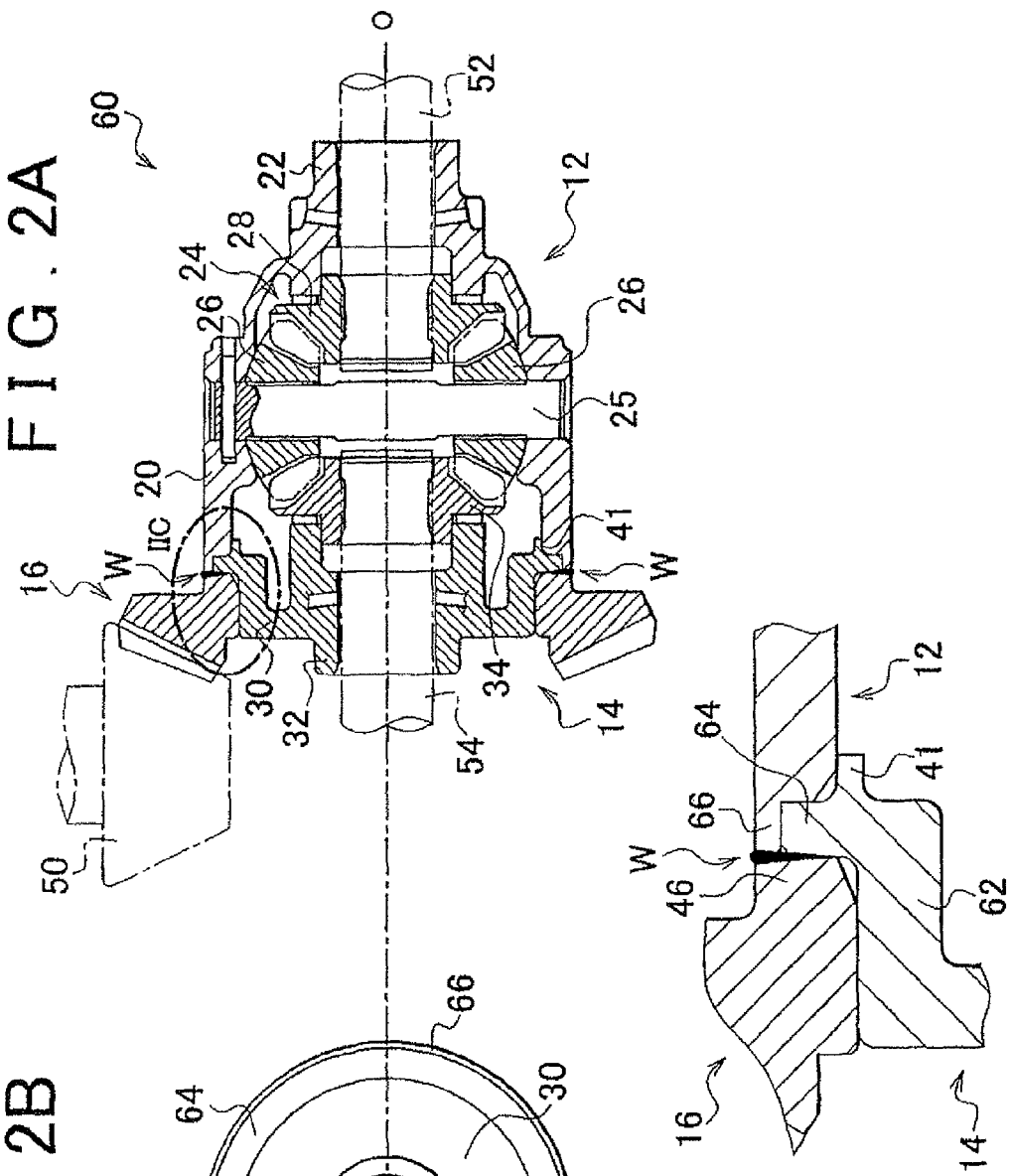

DIFFERENTIAL GEAR AND VEHICLE PROVIDED WITH DIFFERENTIAL GEAR

BACKGROUND OF THE INVENTION

1. Field of the Invention

The invention relates to a differential gear. More particularly, the invention relates to an improvement of a differential gear in which a first differential case that supports a differential mechanism and transmits torque, a second differential case that does not transmit torque to and from the differential mechanism, and a ring gear are all formed separately and integrally joined together by welding. The invention also relates to a vehicle provided with this differential gear.

2. Description of the Related Art

One differential gear in which a differential case is divided into two cases, i.e., a first differential case and a second differential case, in the axial direction, with a differential mechanism that includes a pinion gear and a pair of side gears or the like housed inside the differential case and a ring gear provided on the outer portion of the differential case, and in which the first differential case, the second differential case, and the ring gear are all integrally joined together by welding, is used as a differential gear unit that allows differential operation of left and right wheels of a vehicle, for example. This is because with a four-pinion type differential gear, a forged differential gear, or a limited-slip differential gear (LSD), for example, it is necessary to divide the differential case into two due to structural limitations as well as for assembly reasons and the like. Japanese Patent Application Publication No. 7-54960 (JP-A-7-54960) describes one example of such a differential gear. In this differential gear, the joining portions of the first differential case and the second differential case are overlapped with each another and joined together by welding. A ring gear is then integrally joined by welding to the outer peripheral side of the portion where the joining portions are joined together, and a pinion shaft is attached to the inner peripheral side of the portion where the joining portions are joined together. Also, Japanese Patent Application Publication No. 2006-509172 (JP-A-2006-509172) describes technology in which a first differential case to which a pinion shaft is attached and which rotatably supports a pinion gear is integrally joined by welding to a second differential case that does not support the pinion gear. A ring gear is then integrally joined by welding near the portion where the first differential case is joined to the second differential case.

However, when the first differential case and the second differential case are integrally joined together by welding and a ring gear is then integrally joined, by welding to that differential case in this way, two welding operations must be performed, which increases the manufacturing cost. Incidentally, JP-A-2006-509172 does propose to reduce the number of welds by integrally providing the ring gear on the second differential case, but the conditions for the required strength and wear resistance and the like are different for the differential case than they are for the ring gear, so the resulting product may not necessary be entirely satisfactory, e.g., material limitations may, actually lead to higher costs.

SUMMARY OF THE INVENTION

The invention thus provides a differential gear that reduces manufacturing costs by integrally joining, by welding, a first differential case, a second differential case, and a ring gear, all of which are formed separately, together with a single weld, and a vehicle provided with that differential gear.

A first aspect of the invention relates to a differential gear in which a first differential case that supports a differential mechanism and transmits torque to and from the differential mechanism, a second differential case that does not transmit torque to and from the differential mechanism, and a ring gear are formed separately and integrally joined together by welding. In this differential gear, the first differential case and the second differential case overlap one another such that a first joining portion of the first differential case is positioned on the outer peripheral side of a second joining portion of the second differential case. Also, the ring gear is arranged facing both of those joining portions, and the first differential case, the second differential case, and the ring gear are all integrally joined together by welding at the portion where the ring gear faces both of those joining portions.

In the differential gear according to this first aspect, (a) the first differential case may rotatably support a pinion gear via a pinion shaft that is orthogonal to an axis, and retain one side gear that meshes with the pinion gear in a manner that enables the one side gear to rotate relative to the first differential case around the axis, and (b) the second differential case may retain another side gear that is arranged in the first differential case on the opposite side of the pinion shaft from the one side gear and in mesh with the pinion gear, in a manner that enables the other side gear to rotate relative to the second differential case around the axis. Also, the differential mechanism may include the pinion gear and the pair of side gears.

Accordingly, the first differential case and the second differential case overlap one another such that a first joining portion of the first differential case is positioned on the outer peripheral side of a second joining portion of the second differential case. In addition, the ring gear is arranged facing both of those joining portions, and the first differential case, the second differential case, and the ring gear are all integrally joined together by welding at the portion where the ring gear faces both of those joining portions. As a result, these are able to be joined by a single welding operation, so manufacturing costs can be reduced. Also, the first joining portion of the first differential case that supports the differential mechanism and transmits torque between the ring gear and that differential mechanism is positioned on the outer peripheral side of the second joining portion of the second differential case that does not transmit torque. Therefore, even if the weld joining strength is the same, the transfer torque capacity between the first differential case and the ring gear is greater by an amount corresponding to the difference in the diameters. This is advantageous in terms of strength compared with when the second joining portion of the second differential case is joined by welding in a position on the outer peripheral side. In addition, the state of the weld between the ring gear and the first differential case that transmits torque is able to be visually checked from the outside, which improves reliability.

Also, in this differential gear, (a) the ring gear may be arranged on the outer peripheral side of the first differential case, (b) an outward flange may be integrally provided on the first differential case and a through-hole may be provided in that outward flange, (c) a joining protrusion that is inserted into the through-hole may be provided on the second differential case, and (d) the ring gear may be arranged facing the outward flange and the joining protrusion on the opposite side of the outward flange from the second differential case, and integrally joined by welding at the portion where the ring gear faces the outward flange and the joining protrusion. That is, the portion of the outward flange provided on the first differential case that is on the outer peripheral side of the through-hole may function as the first joining portion, and the joining protrusion provided on the second differential case may function as the second joining portion.

Accordingly, the ring gear is arranged on the outer peripheral side of the first differential case that supports the differential mechanism, so the unit is able to be compact. Also, the outward flange is provided on that first differential case, the through-hole is formed in that outward flange, and the joining protrusion provided on the second differential case is inserted into the through-hole, so this joining protrusion functions as the second joining portion, and the portion of the outward flange that is on the outer peripheral side of the through-hole functions as the first joining portion. That is, arranging the ring gear on the outer peripheral side of the first differential case enables the unit to be more compact, while the first joining portion of the first differential case is able to be joined by welding in a position on the outer peripheral side of the second joining portion of the second differential case, such that sufficient transfer torque capacity between the first differential case and the ring gear can be ensured.

A second aspect of the invention relates to a vehicle provided with the differential gear according to the first aspect described above. According to this second aspect of the invention, a vehicle in which sufficient transfer torque capacity of the drive line can be ensured and that costs less to manufacture can be provided.

BRIEF DESCRIPTION OF THE DRAWINGS

The foregoing and further features and advantages of the invention will become apparent from the following description of example embodiments with reference to the accompanying drawings, wherein like numerals are used to represent like elements; and wherein:

FIGS. 1A, 1B, and 1C are views of one example of a differential gear to which the invention is applied, with FIG. 1A being a sectional view taken along the axis O, FIG. 1B being a right side view of only a second differential case as viewed from the right side of FIG. 1A, and FIG. 1C being an enlarged sectional view of part IC in FIG. 1A; and FIGS. 2A, 2B, and 2C are views of another example embodiment of the invention, with FIG. 2A being a sectional view taken along the axis O, FIG. 2B being a left side view as viewed from the left of FIG. 2A with a ring gear omitted, and FIG. 2C being an enlarged sectional view of part IIC in FIG. 2A.

DETAILED DESCRIPTION OF EMBODIMENTS

The differential gear of the invention is used as a differential gear unit or the like that allows differential operation of left and right wheels of a vehicle, for example. This differential gear is used to transmit rotation that has been transmitted from a propeller shaft or the like to a ring gear, to a pair of left and right drive shafts via a differential mechanism. A ring gear is formed by a conical bevel gear or a hypoid gear, for example, but it may also be formed by a cylindrical gear. Incidentally, this differential gear may also be used as a power transmitting apparatus of something other than a vehicle.

This differential mechanism has one or a plurality of pinion gears and a pair of side gears that are in mesh with that pinion gear(s), for example, with all of these gears being bevel gears, but a planetary gear type differential mechanism or a worm gear type differential mechanism formed by a worm and a worm wheel may also be used. Also, a friction type limited-slip differential or a viscous type limited slip differential may also be provided.

A pinion shaft that rotatably supports a pinion gear is a single straight shaft, for example, with both end portions attached, to a first differential case and one or a pair of pinion gears rotatably arranged on the pinion shaft. Alternatively, however, a trifurcated pinion shaft with three pinion gears or a cross-shaped pinion shaft with four pinion gears may also be used.

When a bevel gear type differential mechanism is used, the first differential case is formed by a stepped cylindrical member having a large diameter portion and a small diameter portion, for example. The large diameter portion supports the pinion gear via the pinion shaft and the small diameter portion houses one of the side gears. A power transmitting shaft such as a drive shaft that is connected via splines or the like to that side gear such that relative rotation between the two is not possible, is arranged sticking through the small diameter portion and extending to the outside.

A second differential case has an annular lid portion and a cylindrical portion that are integrally provided. The lid portion blocks off the open end on the large diameter portion side of the first differential case, and the cylindrical portion continues on from the inner peripheral portion of the lid portion and protrudes in the direction away from the first differential case. The other side gear is retained in the space between the second differential case and the first differential case. A power transmitting shaft such as a drive shaft that is connected via splines or the like to this other side gear such that relative rotation between the two is not possible, is arranged sticking through the cylindrical portion and extending to the outside. The first differential case, the second differential case, and left and right power transmitting shafts such as drive shafts are arranged concentric with a common axis O and able to rotate about that axis O.

The shape of the first differential case and the second differential case may be set appropriately according to the type of differential mechanism and whether the differential is a limited-slip differential, for example. The first differential case may be formed in predetermined shape by forging or molding, for example. Depending on the forging process, joining by welding may be easier (i.e., cracking is less compared with molding, and the differential cases can be made stronger, thinner, and lighter. When an outward flange and a through-hole are provided in the first differential case, the through-hole may also be formed in a later process by machining or the like as necessary. The second differential case may also be formed in the same way by forging, but depending on its shape, it may also be formed by press working.

In a first example embodiment which will be described later, a ring gear is arranged on the outer peripheral side of the first differential else, but the ring gear may also be arranged on the outer peripheral side of the second differential case or on a side portion (i.e., on the side opposite the first differential case side) of the second differential case. In this case, instead of providing a through-hole in the second differential case, the large diameter portion of the first differential case may be engaged with the outside of the lid portion of the second differential case, and a ring gear may be arranged facing that engaged portion and integrally joined by welding.

The welding of the portion where the ring gear faces the engaged portion is done from the outer peripheral side, but laser beam welding or electron beam welding, for example, may also be used for reliably joining by welding up to the second joining portion on the inner peripheral side. If it is possible to join by welding up to the second joining portion, another welding method may also be used. A cylindrical portion (a joining portion) with an outside diameter substantially the same as that of a first joining portion (i.e., an outward flange in the first example embodiment which will be described later) of the first differential case may be provided as necessary on the ring gear. The end surface of this cylindrical portion may be set so as to face the first joining portion and the second joining portion, and the outside diameters of the portions where the end surface of the cylindrical portion faces the joining portions may be set substantially the same. This joining by welding may be performed so that there is no gap around the entire circumference around the axis O.

A plurality of the through-holes and joining protrusions in the first example embodiment that will be described later may be provided at equiangular intervals around the axis O. However, because the second differential case does not contribute to transmitting torque, they may also be provided in just one location as long as the joint is strong enough to prevent the differential cases from separating. The through-hole and joining protrusion may be provided to form an arc shape around the axis O, for example, with the total length around the axis O being equal to or less than ½ of the entire circumference such that the strength of the first differential case will not decrease. Although the through-hole and joining protrusion may be shaped in an arc that is centered around the axis O, other shapes such as round or linearly elongated, square, or rectangular, are also possible.

Hereinafter the first example embodiment of the invention will be described in detail with reference to the accompanying drawings. FIGS. 1A, 1B, and 1C are views of a differential gear 10 to which the invention has been applied. FIG. 1A is a sectional view taken along the axis O, FIG. 1B is a right side view of only a second differential case as viewed from the right side of FIG. 1A, and FIG. 1C is an enlarged sectional view of part IC in FIG. 1A. The differential gear 10 has a differential case that is divided into a first differential case 12 and a second differential case 14 in the direction of the axis O, and a ring gear 16 arranged on the outer peripheral side of the first differential case 12. The first differential case 12, the second differential case 14, and the ring gear 16 are all arranged concentric with the axis O. The first differential case 12 is formed by a stepped cylindrical member that has a large diameter portion 20 and a small diameter portion 22. A bevel gear type differential mechanism 24 is arranged on the large diameter portion 20 side.

The differential mechanism 24 includes a straight pinion shaft 25 that is orthogonal to the axis O, a pair of pinion gears 26 that are rotatably arranged on each end portion of the pinion shaft 25, and a pair of left and right side gears 28 and 34 that mesh with the pair of pinion gears 26. Both end portions of the pinion shaft 25 are attached to the large diameter portion 20 of the first differential case 12, such that torque is transmitted to and from the ring gear 16 via the first differential case 12. The right side gear 28 is arranged to the right of the pinion shaft 25 in FIG. 1A and is in mesh with the pair of pinion gears 26. This right side gear 28 is retained by the small diameter portion 22 in a manner so as to be able to rotate relative to the first differential case 12 about the axis O.

The second differential case 14 is integrally provided with an annular lid portion 30 that blocks off the open end on the large diameter portion 20 side of the first differential case 12, and a cylindrical portion 32 that continues on from the inner peripheral portion of this lid portion 30 and protrudes to the left on the side away from the first differential case 12. The left side gear 34 that meshes with the pinion gear 26 is retained in the space between the second differential case 14 and the first differential case 12 in such a manner that enables the left side gear 34 to rotation relative to the second differential case 14 about the axis O. The cylindrical portion 32 has an inside diameter that is substantially the same as that of the small diameter portion of the first differential case 12. The pinion gears 26 and the left and right side gears 28 and 34 are formed by bevel gears. The right side gear 28 may be regarded as corresponding to one side gear, and the left side gear 34 may be regarded as corresponding to the other side gear.

The first differential case 12 and the second differential case 14 are both formed in predetermined shapes mainly by forging, and then undergo post-processing such as machining as necessary. A joining protrusion 40 that is partially bent at a generally right angle so as to protrude to the first differential case 12 side by forging is provided on the outer peripheral side of the lid portion 30 of the second differential case 14. This joining protrusion 40 forms an arc shape centered around the axis O and is provided in plurality (i.e., three in this example embodiment) at equiangular intervals around the axis O, as is evident from FIG. 1B. Also, each joining protrusion 40 is formed having a length that spans an angle of approximately 60° around the axis O. The total length in the circumferential direction of the three joining protrusions 40 is approximately ½ of the entire circumference. Meanwhile, an outward flange 42 that extends toward the outer peripheral side at a generally right angle with respect to the axis O is integrally provided by forging on the open end on the large diameter portion 20 side of the first differential case 12. In addition, a through-hole 44 is formed in a middle position in the radial direction, of that outward flange 42. The thickness of the outward flange 42 is substantially the same as the protruding dimensions of the joining protrusion 40. The through-hole 44 is formed in generally the same size and shape as the joining protrusion 40 in a position that corresponds to the joining protrusion 40. This through-hole 44 is formed in an arc shape that is centered around the axis O and has a length that spans an angle of approximately 60°. A plurality of these through-holes 44 (i.e., three in this example embodiment) are provided at equiangular intervals around the axis O. The through-holes 44 may be formed by forging, or formed in a later process by machining or press punching or the like.

Then each joining protrusion 40 is inserted into its corresponding through-hole 44. The ring gear 16 is then arranged facing the side surface of the outward flange 42 and the tip end surface of the joining protrusion 40 in the direction of the axis O on the opposite side of the outward flange 42 from the second differential case 14, and laser beam welded from the outer peripheral side at the portion where the ring gear 16 faces the side surface of the outward flange 42 and the tip end surface of the joining protrusion 40. In this way, the three members, i.e., the first differential case 12, the second differential case 14, and the ring gear 16, are all joined together by welding. The protruding dimension of each joining protrusion 40 is generally the same as the thickness of the outward flange 42. Therefore, by assembling the lid portion 30 of the second differential case 14 so that it is in close contact with the tip end surface of the first differential case 12, the tip end of the joining protrusion 40 is generally flush with the surface on the opposite side of the outward flange 42. This tip end of the joining protrusion 40 is then appropriately joined by welding to the ring gear 16 while substantially contacting the ring gear 16. A cylindrical additional protrusion 41 that substantially contacts and fits concentrically with the inner peripheral surface of the large diameter portion 20 of the first differential case is integrally provided on the lid portion 30 of the second differential case 14, so the second differential case 14 is able to be appropriately fixed to the first differential case 12 even if only the joining protrusion 40 is welded.

A cylindrical portion 46 having generally the same outside diameter as the outside diameter of the outward flange 42 is integrally provided on the inner peripheral portion of the ring gear 16. The tip end surface of this cylindrical portion 46 is arranged facing and substantially contacting the side surface of the outward flange 42 and the tip end surface of the joining protrusion 40 in the direction of the axis O. This tip end surface of the cylindrical portion 46 may be appropriately welded from the outer peripheral side to the opposing portion that has generally the same outside diameter. The inside diameter dimension of this ring gear 16 is substantially the same as the outside diameter dimension of the large diameter portion 20 of the first differential case 12. The inner peripheral side of the ring gear 16 is concentrically fitted in a state substantially contacting the outer peripheral surface of the large diameter portion 20, and is appropriately fixed to the first differential case 12. Reference character W in FIGS. 1A and 1C denotes the welding joint. Welding is performed so that there is no gap along the entire circumference around the axis O. The joining protrusion 40 may be regarded as corresponding to a second joining portion, and a portion 42a of the outward flange 42 that is on the outer peripheral side of the through-hole 44 may be regarded as corresponding to a first joining portion where the ring gear overlaps with the first differential gear at the outer peripheral side of the joining protrusion 40.

This kind of differential gear 10 is used as a differential gear unit that allows differential operation of left and right wheels of a vehicle, for example. Rotation that has been transmitted to the ring gear 16 from the drive pinion 50 that is provided on the end portion of the propeller shaft is transmitted from the welding joint W to the first differential case 12, and then to the left and right drive shafts 52 and 54 from the pair of left and right side gears 28 and 34 via the pinion gears 26. The drive shaft 52 is coupled via splines or the like to the side gear 28 in a manner such that prevents it from rotating relative to that side gear 28, and is arranged extending to the outside through the small diameter portion 22. Similarly, the drive shaft 54 is coupled via splines or the like to the side gear 34 in a manner such that prevents it from rotating relative to that side gear 34, and is arranged extending to the outside through the cylindrical portion 32. The drive pinion 50 and the ring gear 16 are formed by hypoid gears, for example.

Here, in this differential gear 10 of the first example embodiment, the first differential case 12 and a second differential case 14 overlap one another in the radial direction such that the first joining portion of the first differential case 12, i.e., the portion 42a of the outward flange 42 that is on the outer peripheral side of the through-hole 44, is positioned on the outer peripheral side of the second joining portion of the second differential case 14, i.e., the joining protrusion 40 that is inserted in the through-hole 44. In addition, the ring gear 16 is arranged facing both of those joining portions in the direction of the axis O, and laser beam welded from the outer peripheral side at the portion where the ring gear faces both of those joining portions. Accordingly, the three members, i.e., the first differential case 12, the second differential case 14, and the ring gear 16, are all integrally joined together by welding. As a result, these are able to be joined by a single welding operation, so manufacturing costs can be reduced.

Also, the first joining portion of the first differential case 12 (which is the differential case that supports the pinion gears 26 and transmits torque between the ring gear 16 and the differential mechanism 24), i.e., the portion 42a of the outward flange 42 that is on the outer peripheral side of the through-hole 44, is positioned on the outer peripheral side of the second joining portion of the second differential case 14, i.e., the joining protrusion 40 that is inserted into the through-hole 44. Therefore, even if the weld joining strength is the same, the transfer torque capacity between the first differential case 12 and the ring gear 16 is greater by an amount corresponding to the difference in the diameters. This is advantageous in terms of strength compared with when the second joining portion of the second differential case 14 is joined by welding in a position, on the outer peripheral side. In addition, the state of the weld between the ring gear 16 and the first differential case 12 that transmits torque is able to be visually checked from the outside, which improves reliability.

Also, the differential gear 10 of this first example embodiment is able to be compact in the direction of the axis O because the ring gear 16 is arranged on the outer peripheral side of the first differential case 12 that supports the differential mechanism 24. Also, the outward flange 42 is provided on the first differential case 12, the through-hole 44 is formed in that outward flange 42, and the joining protrusion 40 provided on the second differential case 14 is inserted into that through-hole 44. Therefore, this joining protrusion 40 functions as the second joining portion, and the portion 42a of the outward flange 42 that is on the outer peripheral side of the through-hole 44 functions as the first joining portion. That is, arranging the ring gear 16 on the outer peripheral side of the first differential case 12 enables the unit to be more compact, while the first joining portion of the first differential case 12 is able to be joined by welding in a position on the outer peripheral side of the second joining portion of the second differential case 14, such that sufficient transfer torque capacity between the first differential case 12 and the ring gear 16 can be ensured.

Also, in the first example embodiment, the first differential case 12 and the second differential case 14 are both formed in predetermined shapes mainly by forging. Accordingly, joining by welding makes it possible to appropriately integrate the differential cases easier (i.e., they are less likely to crack) compared with molding, and they can be made stronger, thinner, and lighter.

Incidentally, the foregoing first example embodiment describes a case in which the ring gear 16 is arranged on the outer peripheral side of the first differential case 12 that supports the differential mechanism 24. Alternatively, however, the ring gear 16 may also be arranged facing the other direction, as it is in a differential gear 60 according to a second example embodiment of the invention shown in FIGS. 2A to 2C. That is, a cylindrical supporting portion 62 that protrudes out toward the first differential case 12 side is integrally provided concentric with the axis O on the outer peripheral edge of the lid portion 30 of the second differential case 14. The ring gear 16 fits on the outer peripheral side of that cylindrical supporting portion 62, and an outward flange 64 that extends out toward the outer peripheral side is integrally provided on the tip end of that cylindrical supporting portion 62. Also, a cylindrical engaging portion 66 that engages with the outer peripheral side of the outward flange 64 is integrally provided on the tip end of the large diameter portion 20 of the first differential case 12. The tip end surface of this engaging portion 66 and the side surface of the outward flange 64 are made to face the tip end surface of the cylindrical portion 46 of the ring gear 16 in the direction of the axis O, and these opposing surfaces are then integrally joined by laser beam welding. In this case, the engaging portion 66 may be regarded as corresponding to the first joining portion, and the outward flange 64 may be regarded as corresponding to the second joining portion. FIG. 2A is a sectional view taken along the axis O, FIG. 213 is a left side view as viewed from the left of FIG. 2A with the ring gear omitted, and FIG. 2C is an enlarged sectional view of part IIC in FIG. 2A.

While first and second example embodiments of the invention have been described in detail with reference to the drawings, these are no more than example embodiments. That is the invention may be carried out in modes that have been modified or improved in any of a variety of ways based on the knowledge of one skilled in the art.

The invention claimed is:

1. A differential gear comprising:
   a first differential case that supports a differential mechanism and transmits torque to and from the differential mechanism;
   a second differential case that does not transmit torque to and from the differential mechanism; and
   a ring gear,
   wherein the first differential case, the second differential case, and the ring gear are formed separately;
   the first differential case and the second differential case overlap one another such that a first joining portion of the first differential case is positioned on the outer peripheral side of a second joining portion of the second differential case; and
   the ring gear is arranged facing both of the first joining portion and the second joining portion, and the first differential case, the second differential case, and the ring gear are all integrally joined together by welding at the portion where the ring gear faces both of the first joining portion and the second joining portion.

2. The differential gear according to claim 1, wherein the first differential case rotatably supports a pinion gear via a pinion shaft that is orthogonal to an axis, and retains one side gear that meshes with the pinion gear in a manner that enables the one side gear to rotate relative to the first differential case around the axis; the second differential case retains another side gear that is arranged in the first differential case on the opposite side of the pinion shaft from the one side gear and in mesh with the pinion gear, in a manner that enables the other side gear to rotate relative to the second differential case around the axis; and the differential mechanism includes the pinion gear and the pair of side gears.

3. The differential gear according to claim 1, wherein the ring gear is arranged on the outer peripheral side of the first differential case; an outward flange is integrally provided on the first differential case; a through-hole is provided in the outward flange; a joining protrusion that is inserted into the through-hole is provided on the second differential case; and the ring gear is arranged facing the outward flange and the joining protrusion on the opposite side of the outward flange from the second differential case, and integrally joined by welding at the portion where the ring gear faces the outward flange and the joining protrusion.

4. A vehicle comprising the differential gear according to claim 1.

* * * * *